United States Patent [19]

Nakahama

[11] Patent Number: 5,449,713
[45] Date of Patent: Sep. 12, 1995

[54] ETHYLENE/α-OLEFIN/DIENE RUBBER COMPOSITION AND USE OF THE SAME

[75] Inventor: Hidenari Nakahama, Ichihara, Japan

[73] Assignee: Mitsui Petrochemical Industries, Ltd., Tokyo, Japan

[21] Appl. No.: 257,577

[22] Filed: Jun. 9, 1994

Related U.S. Application Data

[63] Continuation of Ser. No. 917,043, filed as PCT/JP92/00425, Apr. 6, 1992, abandoned.

[30] Foreign Application Priority Data

Apr. 5, 1991 [JP] Japan .................. 3-073319

[51] Int. Cl.$^6$ .............................................. C08K 5/01
[52] U.S. Cl. .................... 524/491; 525/232; 525/240
[58] Field of Search .................. 524/491; 525/232, 240

[56] References Cited

U.S. PATENT DOCUMENTS 3,884,993  5/1975  Gros ........................... 260/897 A
4,922,046  5/1990  Kinoshita et al. ................ 525/330.3

FOREIGN PATENT DOCUMENTS 0246745  11/1987  European Pat. Off. .
0264653  4/1988  European Pat. Off. .
0358393  3/1990  European Pat. Off. .

Primary Examiner—Peter D. Mulcahy
Attorney, Agent, or Firm—Sherman and Shalloway

[57] ABSTRACT

The ethylene/α-olefin/diene rubber composition of the present invention is a specific ethylene/α-olefin/diene rubber composition comprising a high-molecular ethylene/α-olefin/diene copolymer rubber (A) having a specific molecular weight distribution, a specific intrinsic viscosity [η] and a specific iodine value, and a low-molecular liquid ethylene/α-olefin copolymer (B) having a specific intrinsic viscosity [η]. This ethylene/α-olefin/diene rubber composition of the invention is excellent in both the processability (flowability) and the shape retention properties in the vulcanization molding process, and the rubber composition can provide a vulcanized rubber molded product which is excellent in surface smoothness, mechanical strength, low-compression permanent strain properties, resistance to abrasion and resistance to dynamic fatigue.

8 Claims, 1 Drawing Sheet

ETHYLENE/α-OLEFIN/DIENE RUBBER COMPOSITION AND USE OF THE SAME

This application is a continuation of application Ser. No. 07/917,043, filed as PCT/JP92/00425, Apr. 6, 1992 now abandoned.

TECHNICAL ART

The present invention relates to an ethylene/α-olefin/diene rubber composition and use of the same. More particularly, the invention relates to an ethylene/α-olefin/diene rubber composition which shows good processability (flowability) and good shape retention properties in the vulcanization molding process and which can give a molded product excellent in surface smoothness, mechanical strength and resistance to dynamic fatigue, and also relates to a vulcanized rubber molded product obtained by vulcanizing such rubber composition.

BACKGROUND ART

Various processes have been heretofore tried for the purpose of obtaining ethylene/α-olefin/diene copolymer rubbers having good processability (high flowability).

For example, Japanese Patent Publication No. 46(1971)-29012 describes that a specific ethylene/propylene rubber composition composed of 20–80 % by weight of an ethylene/propylene rubber having inherent viscosity of not more than 1.0 and 80–20 % by weight of an ethylene/propylene rubber having inherent viscosity of not less than 2.5 is excellent in the processability. In this publication, however, any ethylene/α-olefin/diene rubber improved in other properties such as fatigue resistance and mechanical strength is not disclosed.

Japanese Patent Laid-open Publication No. 49(1974)-8541 discloses a process of mixing 15–65 % by weight of a high-molecular ethylene/propylene rubber having an average molecular weight of 40,000 to 200,000 and 35–85 % by weight of a low-molecular ethylene/propylene rubber having an average molecular weight of 2,000 to 30,000 with each other to improve the flowability of the resulting rubber, and also describes that the amount of the low-molecular ethylene/propylene rubber used in this process preferably is as large as possible to improve the flowability. Either in the publication, however, any ethylene/α-olefin/diene rubber improved in other properties such as fatigue resistance and mechanical strength is not disclosed.

Further, Japanese Patent Publication No. 59(1984)-14497 discloses a specific ethylene copolymer rubber composition as an ethylene copolymer rubber composition having high processability and high physical properties in the vulcanization process, which comprises:

5–70 parts by weight of an ethylene/α-olefin/polyene copolymer rubber (A) having an intrinsic viscosity $[\eta]_A$ of 0.8 to 6.0 dl/g as measured in decalin of 135° C., an iodine value of 8 to 50 and a molar ratio of ethylene/α-olefin within the range of 50/50 to 95/5; and 30–95 parts by weight of an ethylene/α-olefin/polyene copolymer rubber (B) having an intrinsic viscosity $[\eta]_B$ of 0.1 to 5.0 dl/g as measured in decalin of 135° C., satisfying the condition of $[\eta]_A/[\eta]_B \geq 1.2$, and having an iodine value of smaller than the iodine value of the rubber (A) by 3 to 45 and within the range of 3 to 40 and a molar ratio of ethylene/α-olefin within the range of 50/50 to 95/5.

Furthermore, Japanese Patent Laid-open Publication No. 53(1988)-22551 describes an improved rubber composition employable for rubber vibration insulator. Generally, a high-molecular EPDM is good in the resistance to dynamic fatigue but poor in the processability. The above publication describes that the processability can be enhanced by blending a high-molecular EPDM with a low-molecular EPDM, and also describes that the low-molecular EPDM in the unvulcanized state serves as an processing aid and participates in the crosslinking reaction after the vulcanization to greatly contribute to enhancement in the dynamic fatigue resistance. However, the present inventors have found that when the low-molecular component is more or less incorporated by the crosslinking reaction, the obtained vulcanized rubber molded product is deteriorated not only in the compression permanent strain properties but also in the fatigue resistance.

By the way, physical properties required for EPDM used for manufacturing sponge rubber articles such as window frames of automobiles include shape retention properties indicating whether the same shape as that of a nozzle can be retained or not until the vulcanization of the EPDM is complete, processability (flowability), and surface smoothness of the vulcanized rubber molded product obtained by the vulcanization molding process.

In many cases, a static force is applied to the vulcanized rubber articles, so that EPDM of high molecular weight (high Mooney viscosity) is demanded as a material which is not physically deformed for a long period of time.

However, it is difficult to prepare a rubber satisfying all of processability (flowability) of EPDM, surface smoothness of the vulcanized rubber article obtained therefrom, shape retention properties in the vulcanization molding process and low-compression permanent strain properties at the same time.

Accordingly, eagerly demanded is an ethylene/α-olefin/diene rubber composition which is excellent in the processability (flowability) and the shape retention properties in the vulcanization molding process and capable of providing a vulcanized rubber molded product enhanced in surface smoothness, mechanical strength and resistance to dynamic fatigue.

The present invention intends to solve the above-mentioned problems accompanied by the prior art. The object of the present invention is to provide an ethylene/α-olefin/diene rubber composition which is excellent in processability (flowability) and shape retention properties in the vulcanization molding process and capable of giving a vulcanized rubber molded product enhanced in surface smoothness, mechanical strength and resistance to dynamic fatigue. Further, the object of the invention is to provide a vulcanized rubber molded product prepared by vulcanizing the above-mentioned rubber composition.

DISCLOSURE OF INVENTION

There is provided by the present invention an ethylene/α-olefin/diene rubber composition comprising:

95–50 % by weight of a high-molecular ethylene/α-olefin/diene copolymer rubber (A) derived from ethylene, α-olefin of 3–20 carbon atoms and non-conjugated diene and having a molecular weight distribution Q (Mw/Mn) of less than 4 as measured by a GPC measuring method, an intrinsic viscosity [η] of 2.7 to 6.0 dl/g as measured in decalin of 135° C. and an iodine value of 10 to 40; and 5-50 % by weight of a low-molecular liquid ethylene/α-olefin copolymer (B) derived from ethylene and α-olefin of 3-20 carbon atoms and having an intrinsic viscosity [η] of 0.2 to 0.7 dl/g as measured in decalin of 135° C.;

said composition having Mooney viscosity $ML_{1+4}(100°$ C.) ranging from 20 to 150 and a ratio $(IV_1/IV_2)$ of an iodine value $(IV_1)$ of the ethylene/α-olefin rubber composition having a molecular weight of 3,000 to 15,000 to an iodine value $(IV_2)$ Of the ethylene/α-olefin/diene rubber composition having a molecular weight of 80,000 to 120,000 of not more than 0.1.

There is also provided by the invention a vulcanized rubber molded product prepared by vulcanizing the above-mentioned ethylene/α-olefin/diene rubber composition.

Figure 1:
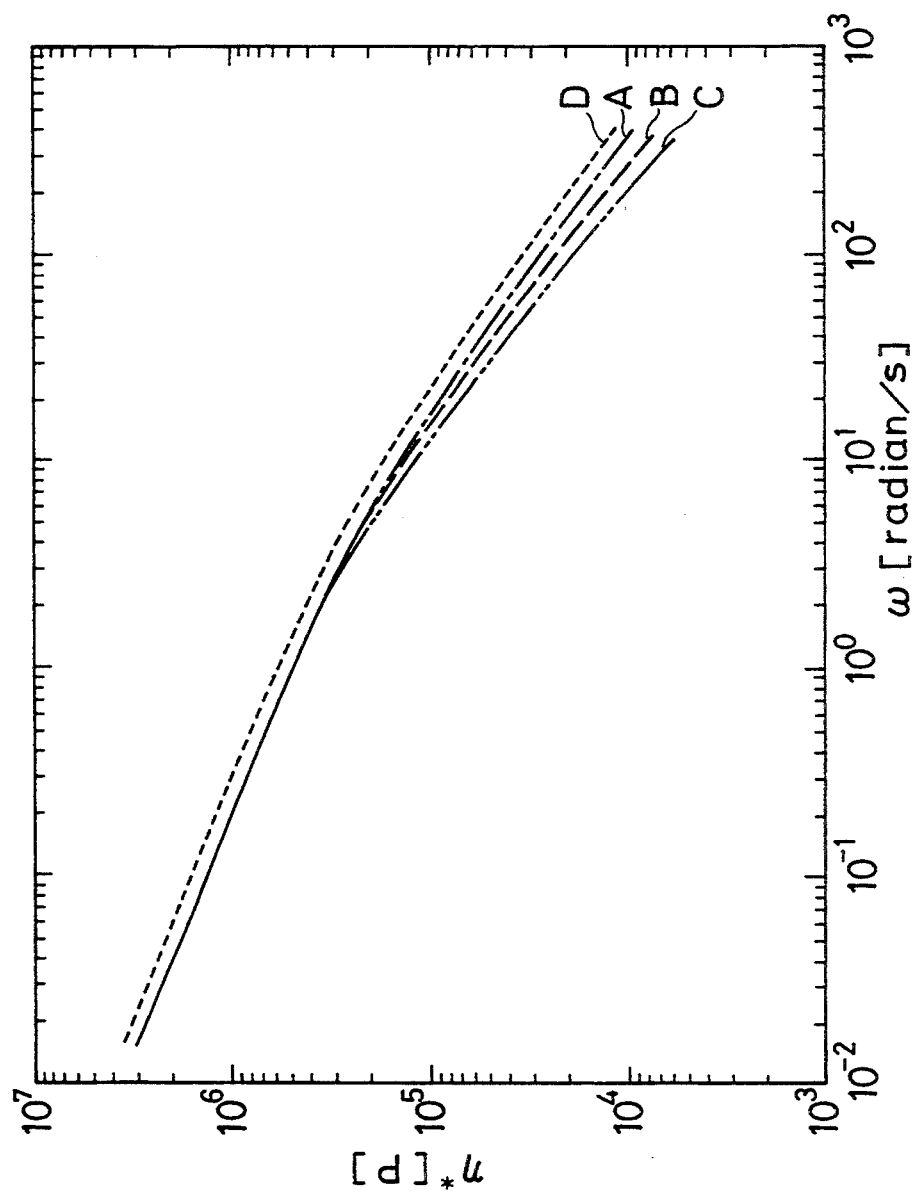
FIG. 1 graphically shows relationships between complex viscosity η* and frequency ω of ethylene/α-olefin/diene rubber compositions.

A: a graph showing a relationship between complex viscosity η* and frequency ω of an ethylene/α-olefin/diene rubber composition of Comparative Example 1.

B: a graph showing a relationship between complex viscosity η* and frequency ω of an ethylene/α-olefin/diene rubber composition of Example 1.

C: a graph showing a relationship between complex viscosity η* and frequency ω of an ethylene/α-olefin/diene rubber composition of Example 2.

D: a graph showing a relationship between complex viscosity η* and frequency ω) of an ethylene/α-olefin/diene rubber composition of Comparative Example 2.

BEST MODE FOR CARRYING OUT THE INVENTION

The ethylene/α-olefin/diene rubber composition and the vulcanized rubber molded product according to the present invention are described below in more detail.

The ethylene/α-olefin/diene rubber composition of the invention comprises a specific high-molecular ethylene/α-olefin/diene copolymer rubber (A) and a specific low-molecular liquid ethylene/α-olefin copolymer (B).

High-molecular Ethylene/α-olefin/diene Copolymer Rubber (A)

The high-molecular ethylene/α-olefin/diene copolymer rubber (A) employable in the invention is an ethylene/α-olefin/diene copolymer rubber prepared by copolymerizing ethylene, α-olefin of 3-20 carbon atoms and non-conjugated diene. This high-molecular ethylene/α-olefin/diene copolymer rubber (A) may be referred to as a high molecular component (A) hereinafter.

Examples of the α-olefins of 3-20 carbon atoms include propylene, butene-1, hexene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 and eicosene-1. These α-olefins can be employed singly or in combination. Of these, particularly preferred are propylene and butene-1.

Examples of the non-conjugated dienes include chain non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Of these, preferred are 1,4-hexadiene and cyclic non-conjugated dienes, particularly dicyclopentadiene and 5-ethylidene-2-norbornene.

The ethylene/α-olefin/diene copolymer rubber used in the invention has an iodine value, that is one indication of non-conjugated diene content, of 10 to 40, preferably 20 to 30.

Further, the ethylene/α-olefin/diene copolymer rubber used in the invention has a molecular weight distribution Q (Mw/Mn), as measured by a GPC measuring method, of less than 4, preferably not more than 3. By the use a high-molecular ethylene/α-olefin/diene copolymer rubber (A) having such molecular weight distribution, there can be obtained an ethylene/α-olefin/diene rubber composition which is excellent in shape retention properties and capable of providing a vulcanized rubber molded product enhanced in mechanical strength, low-compression permanent strain properties, fatigue resistance and abrasion resistance.

Furthermore, the ethylene/α-olefin/diene copolymer rubber used in the invention has an intrinsic viscosity [η], as measured in decalin of 135° C., of generally not less than 2.7 dl/g, preferably within the range of 2.7 to 6.0 dl/g, more preferably within the range of 3.0 to 6.0 dl/g.

Especially in the case of using an ethylene/α-olefin/diene copolymer rubber having the above-mentioned intrinsic viscosity among the ethylene/α-olefin/diene copolymer rubbers having the above-mentioned molecular weight distribution Q (Mw/Mn), the resulting ethylene/α-olefin/diene rubber composition shows remarkably improved effects in the above-mentioned various properties.

The ethylene/α-olefin/diene copolymer rubber mentioned as above can be prepared, for example, by a process described in Japanese Patent Publication No. 59(1984)-14497. That is, the high-molecular ethylene/α-olefin/diene copolymer rubber (A) can be prepared by copolymerizing ethylene, α-olefin and diene using hydrogen as a molecular weight regulator in the presence of a Ziegler catalyst.

Low-molecular Liquid Ethylene/α-olefin Copolymer (B)

The low-molecular ethylene/α-olefin copolymer (B) in liquid state employable in the invention is a liquid ethylene/α-olefin copolymer obtained by copolymerizing ethylene and α-olefin of 3-20 carbon atoms, and the copolymer (B) contains no diene component. This low-molecular liquid ethylene/α-olefin copolymer (B) may be referred to as a low molecular component (B) hereinafter.

The liquid ethylene/α-olefin copolymer is a random copolymer of ethylene and α-olefin of 3-20 carbon atoms.

Examples of the α-olefins of 3–20 carbon atoms include propylene, butene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 and eicosene-1. These α-olefins can be employed singly or in combination. Of these, particularly preferred are propylene and butene-1.

The present invention is designed in the qualities so that the high molecular component undertakes improvements in the mechanical strength, low-compression permanent strain properties, fatigue resistance, abrasion resistance, shape retention properties, etc., and the low-molecular component undertakes improvements in the processability (flowability), surface smoothness of the vulcanized rubber molded product, etc.

However, in an ethylene/α-olefin/diene rubber composition only showing bimodal molecular weight distribution (i.e., molecular weight distribution possessing two modes), an improvement degree of the above properties given by the high-molecular component and an improvement degree of the above properties given by the low-molecular component are almost inversely proportional to each other. Therefore, such ethylene/α-olefin/diene rubber composition is unable to provide a vulcanized rubber molded product which is prominently enhanced in the above-described physical properties, even if the composition is excellent in the processability.

The present inventors have further studied on the low-molecular component and they have found the followings. That is, in the vulcanized rubber molded product obtained from an ethylene/α-olefin/diene rubber showing a bimodal molecular weight distribution, the low-molecular component constituting the vulcanized rubber molded product is required not to be cross-linked as a polymer. Accordingly, a liquid ethylene/α-olefin copolymer containing no diene is used as the low-molecular component in the present invention.

The ethylene content in the liquid ethylene/α-olefin copolymer employable for the invention is generally in the range of 20 to 80 % by mol, preferably 30 to 70 % by mol, more preferably 40 to 60 % by mol. The liquid ethylene/α-olefin copolymer having an ethylene content within the above range is very stable to heat, so that the copolymer is not decreased in amount during the kneading process with the above-mentioned high-molecular component (A), nor carbonized in the molding process, and therefore the resulting molded product is not stained.

The low-molecular component (B) employable in the invention, namely, a liquid ethylene/α-olefin copolymer, has an intrinsic viscosity $[\eta]$ of 0.2 to 0,7 dl/g, preferably 0.24 to 0.5 dl/g, as measured in decalin of 135° C.

By the use of a liquid ethylene/α-olefin copolymer having such intrinsic viscosity as the low-molecular component (B), there can be obtained an ethylene/α-olefin/diene rubber composition having high processability (flowability).

When the intrinsic viscosity $[\eta]$ of the liquid ethylene/α-olefin copolymer used as the low-molecular component (B) in the invention is less than 0.2 dl/g, the processability thereof is lowered. On the other hand, when the intrinsic viscosity $[\eta]$ thereof exceeds 0.7 dl/g, a viscosity of a blend obtained by blending this liquid ethylene/α-olefin copolymer with the above-mentioned high molecular component (A) is increased. In the case of actually preparing a vulcanized rubber molded product, the rigidity of the product is necessarily regulated to be within a certain range. Therefore, if the intrinsic viscosity $[\eta]$ of the liquid ethylene/α-olefin copolymer exceeds 0.7 dl/g, increase of the viscosity of the above-mentioned blend and increase of the rigidity of the resulting product should be restrained, and in addition, oil is required to be used. Accordingly, a vulcanized rubber molded product having high mechanical strength cannot be obtained from an ethylene/α-olefin/diene rubber composition which is prepared using the liquid ethylene/α-olefin copolymer whose intrinsic viscosity $[\eta]$ is more than 0.7 dl/g.

The liquid ethylene/α-olefin copolymer is equivalent to oil in their compositions. However, with respect to the liquid ethylene/α-olefin copolymer having an intrinsic viscosity $[\eta]$ within the range of 0.2 to 0.7 dl/g, even if the molecular weight (intrinsic viscosity $[\eta]$) of the high-molecular component (A) which is used in combination with this liquid ethylene/α-olefin copolymer is extremely high, the processability (flowability) of the resulting composition required in the kneading process or the molding process using a roll, Banbury mixer, etc. can be attained by increasing the amount of this liquid ethylene/α-olefin copolymer.

In the case of ethylene/α-olefin/diene rubber compositions in which conventional oils such as process oil, paraffinic oil and naphthene oil are extended, improvement of the processability thereof is limited to a certain level. In the case of an oil-extended type ethylene/α-olefin/diene copolymer rubber composition having an intrinsic viscosity $[\eta]$ of more than 3.5 dl/g, there is considered a method of decreasing the viscosity of the composition in the molding process by using an oil in a large amount for the purpose of improving the processability so that the rigidity of the resulting product might be within a fixed range. However, since the composition shows a poor dispersing power to carbon or the like, a vulcanized rubber molded product excellent in the resistance to dynamic fatigue cannot be obtained.

The liquid ethylene/α-olefin copolymer employable in the invention can be prepared, for example, by a process described in Japanese Patent Publication No. 2(1990)-1163. In concrete, the ethylene/α-olefin copolymer can be prepared by random-copolymerizing ethylene and α-olefin of 3–20 carbon atoms using hydrogen as a molecular weight regulator in the presence of a Ziegler catalyst.

Ethylene/α-olefin/diene Rubber Composition

In the ethylene/α-olefin/diene rubber composition of the invention, the ethylene/α-olefin/diene copolymer rubber (i.e., high-molecular component (A)) is present in an amount of 95 to 50 % by weight, preferably 90 to 50 % by weight, per 100 % by weight of the total amounts of the high-molecular component (A) and the low-molecular component (B), and the liquid ethylene/α-olefin copolymer (i.e., low-molecular component (B)) is present in an amount of 5 to 50% by weight, preferably 10 to 50% by weight, per 100% by weight of the total amounts of the high-molecular component (A) and the low-molecular component (B).

The ethylene/α-olefin/diene rubber composition of the invention composed of the above-mentioned high-molecular component (A) and low-molecular component (B) has Mooney viscosity $ML_{1+4}(100°\,C.)$ of 20 to 150, preferably 30 to 135, and has a ratio $(IV_1/IV_2)$ of iodine value ($IV_1$) of the ethylene/α-olefin/diene rubber composition having a molecular weight of 3,000 to 15,000 to iodine value ($IV_2$) of the ethylene/α-olefin/diene rubber having composition a molecular weight of 80,000 to 120,000 of not more than 0.1, preferably 0. The ethylene/α-olefin/diene rubber composition having the Mooney viscosity $ML_{1+4}(100°$ C.) within the above range and the ratio of iodine values ($IV_1/IV_2$) within the above range shows excellent kneading properties in the kneading process using Banbury mixer, etc.

The ethylene/α-olefin/diene rubber composition of the invention can be prepared by mixing a solution or a suspension of the high-molecular component (A) with a solution or a suspension of the low-molecular component (B), and collecting the resulting solid substance from the mixture. Otherwise, the ethylene/α-olefin/diene rubber composition of the invention can be also prepared by a multi-stage polymerization process comprising first obtaining any one of the high-molecular component (A) and the low-molecular component (B) through polymerization and then obtaining the other component through polymerization in the presence of the initially obtained polymer.

The vulcanized rubber molded product of the invention is a molded product obtained by vulcanizing the above-mentioned ethylene/α-olefin/diene rubber composition of the invention. In the case of preparing the vulcanized rubber molded product of the invention, there can be used various additives which are conventionally and widely used in the preparation of vulcanized rubber molded products composed of ethylene/propylene rubbers, etc., with the proviso that the addition of those additives does not mar the objects of the invention. Examples of the additives include a filler, a vulcanizing agent, a vulcanizing accelerator and a vulcanizing aid. For example, if carbon black is used as a filler, the amount of carbon black is generally in the range of 5 to 90 parts by weight, preferably 40 to 85 parts by weight, per 100 parts by weight of the ethylene/α-olefin/diene rubber composition.

Kneading of the additives and the ethylene/α-olefin/diene rubber composition of the invention is carried out by means of ordinary rubber-kneading machines such as Banbury mixer, open roll and kneader.

There is no specific limitation on the method for molding and vulcanizing the rubber, but generally used are transfer molding and injection molding.

EFFECT OF THE INVENTION

The ethylene/α-olefin/diene rubber composition of the invention contains a specific high-molecular ethylene/α-olefin/diene copolymer rubber (A) and a specific low-molecular liquid ethylene/α-olefin copolymer (B) in the specific amounts. Further, the Mooney viscosity $ML_{1+4}(100°$ C.) of the composition and the ratio ($IV_1/IV_2$) of iodine value ($IV_1$) of the ethylene/α-olefin/diene rubber composition having a molecular weight of 3,000 to 15,000 to iodine value ($IV_2$) of the ethylene/α-olefin/diene rubber composition having a molecular weight of 80,000 to 120,000 are both within the specific ranges. Therefore, the rubber composition of the invention not only shows high processability (flowability) and excellent shape retention properties in the vulcanization molding process, but also provides a vulcanized rubber molded product which is excellent in surface smoothness, mechanical strength, low-compression permanent strain properties, resistance to abrasion and resistance to dynamic fatigue.

The ethylene/α-olefin/diene rubber composition of the invention shows such excellent effects as mentioned above, so that it can be favorably used as a rubber composition for rubber vibration insulator (particularly engine mount and side wall of automobile tire), sponge rubber and cast-molded article.

Examples of the present invention and comparative examples are given below, but those examples are given by no means to restrict the invention.

The methods for evaluating properties of the ethylene/α-olefin/diene rubber compositions obtained in the examples and the comparative examples are as follows.

[1] Molecular weight distribution Q (Mw/Mn)

The molecular weight distribution Q (Mw/Mn) was measured in the following manner in accordance with "Gel Permeation Chromatography" edt. by Takeuchi, published by Maruzen K. K.

(1) With respect to standard polystyrene already known in its molecular weight (monodispersed polystyrene, available from Toso K.K.), the molecular weight M and GPC (Gel Permeation Chromatography) count thereof were measured. From the molecular weight M and the elution volume EM, a correlational calibration curve therebetween was drawn. The polystyrene concentration in this case is set to 0.02% by weight.

(2) A GPC pattern of a sample was determined by the GPC measuring method, and the molecular weight of the sample was determined by the calibration curve obtained by the step (1). The conditions for preparing the sample and the GPC measuring conditions are as follows.

Conditions for preparing sample (a) A sample was dispensed and charged into a conical flask with an o-dichlorobenzene solvent so that the concentration of the sample in the solution was 0.04% by weight.

(b) To the sample contained in the conical flask was added 2,6-di-tert-butyl-p-cresol (antiaging agent) in an amount of 0.1% by weight based on the amount of the polymer solution.

(c) The conical flask was heated to 140° C. and the content in the flask was stirred for about 30 minutes to dissolve the sample in the solvent.

(d) Keeping the conical flask at 135° to 140° C., the solution was filtered over a pour filter having a diameter of 1 μm.

(e) The obtained filtrate was subjected to GPC analysis.

GPC measuring conditions (a) device: 200 type, produced by Waters (b) column: S-type (Mix type), produced by Toso K.K.

(c) amount of sample: 2 ml (d) temperature: 135° C.

(e) flow rate: 1 ml/mm (f) theoretical total number of column: $2 \times 10^4 - 4 \times 10^4$ (measured value by acetone)

[2] Rolling processability

The temperature of both a front roll and a back roll were set to 55° C., and the ethylene/α-olefin/diene rubber composition only was roughly milled for 5 minutes. After the rough milling, tendency of bite of the ethylene/α-olefin/diene rubber composition into the rolls and tendency of winding thereof onto the rolls were observed. The results on the rolling processability were classified into 5 classes and evaluated.

5-class evaluation

5: A rubber band is in perfect contact with the roll, and the bank is smoothly rotated.

4: A rubber band is sometimes released from the roll surface between the top of the roll and the bank.

3: A rubber band is released from the roll surface between the top of the roll and the bank.

2: A rubber band is not in contact with the roll surface, and the roll processing is impossible unless the rubber band is supported with a hand.

1: A rubber band is not in contact with the roll surface at all and falls off from the roll, and the roll processing is impossible unless the rubber band is supported with a hand.

[3] Extrusion processability and surface smoothness

The ethylene/α-olefin/diene rubber composition was extruded from a nozzle [L/D (90 mm/3.0 mm): 30] at 190° C., and measured on the extrusion processability and the surface smoothness at a shear rate of 24.5 sec$^{-1}$ by means of a capillary rheometer (SCER, produced by Shimazu Seisakusho K.K.). The results were classified into 6 classes, and evaluated. In those classes, the most favorable processability and surface smoothness is set to 5, and a state where melt fracture is observed is set to 0.

5: The surface has no protruded and depressed portion and is glossy.

4: The surface scarcely has protruded and depressed portions and is not glossy.

3: The surface has a small number of protruded and depressed portions and is not glossy.

2: The surface has protruded and depressed portions and is not glossy.

1: The surface has protruded and depressed portions of large size and is not glossy at all.

0: Melt fracture is brought about on the surface, and the surface is in the wavy (i.e., bellows-like) state.

[4] Tensile test

A vulcanized rubber sheet was punched to give a dumbbell specimen of No. 3 described in JIS K 6301 (1989). The specimen was subjected to a tensile test under the conditions of a measuring temperature of 25° C. and a tensile rate of 500 mm/min in accordance with a method regulated by JIS K 6301, Section 2, to measure a 25% modulus ($M_{25}$), a 100% modulus ($M_{100}$), a 200% modulus ($M_{200}$), a 300% modulus ($M_{300}$), a tensile stress at break $T_B$ and a tensile elongation at break $E_B$.

[5] Rigidity test

The rigidity test was conducted in accordance with JIS K 6301 (1989), to measure a spring rigidity $H_S$ (rigidity of JIS A).

[6] Compression permanent strain test

The compression permanent strain test was conducted in accordance with JIS K 6301 (1989).

[7] Fixed-load fatigue test

The fixed-load fatigue test was conducted using an oil-pressure servo fatigue tester (FT-2-2101 type, produced by Saginomiya Seisakusho K.K.) under the following conditions.
Testing conditions
  Measuring temperature: 25° C.
  Frequency: 5 Hz
  Wave form: Sin wave
  Load: 60 kgf/cm$^2$, 70 kgf/cm$^2$, 80 kgf/cm$^2$
  Specimen: A specimen was prepared referring to a process described in "Rubber Vibration Insulator", Nippon Tetsudo Sharyo Kogyo Kyokai, pp.31–43.
  Molding process: transfer molding Vulcanization process: vulcanization by means of heater press A vulcanized rubber specimen obtained by bringing into contact with a metallic tube (diameter: 80 mm, length: 50 mm, thickness: 2 mm) surrounds a cylinder (diameter: 17 mm, length: 50 mm, thickness 3.5 mm) positioning at the center of the specimen, and the specimen is adhered to the cylinder. The specimen has a thickness of 40 mm and a width of 20 mm, and the specimen is I-shaped when seen from the upper side.

In the dynamic fatigue test, a piston was moved upwards by 20 mm from a position indicating no load and stopped and this procedure was repeated. The extended specimen was observed on its surface. When a length of a crack on the surface reached 1 mm, a breakage of the specimen was considered to occur. The resistance of dynamic fatigue of the specimen was evaluated by the number strokes until occurrence of the breakage.

[8] William abrasion test

The William abrasion test was conducted in accordance with British Standard 903, Part A9 (1957). The abrasion resistance of the specimen was evaluated by the abrasion wear (cc) per 1,000-time abrasion.
Testing Conditions
  Rotation speed of abrasive plate: 37 r.p.m.
  Abrasive cloth: "wet or dry Tri-M-ite cloth grit 180×CI", (trade name, available from Three-M.)

[9] Shape retention properties

Each of ethylene/α-olefin/diene rubber samples was heated at 160° C. for 4 minutes and then cooled for 6 minutes, to give a specimen (thickness: 5 mm, width: 20 mm, length: 10 mm) having such a shape that the central portion is bent at a right angle (i.e. L-shaped). In the test of the shape retention properties, one side of the L-shaped specimen was sandwiched between two metal plates, other side thereof was placed vertically against the ground, and in this state, the specimen was deformed for 5 hours. The shape retention properties were evaluated by a change rate of the length of the specimen in the vertical direction against the ground.

Shape retention rate (%)=(Length of specimen before deformation)÷(Length of specimen after deformation)×100

In the first place, there were prepared 5 kinds of high-molecular components, 6 kinds of low-molecular components and one kind of oil (replacing for a low-molecular component, as a processing aid) employable for Examples and Comparative Examples. Characteristics of those components are described below.

[High-molecular component 1 (EPT-1)]

| | |
|---|---|
| Ethylene content: | 70% by mol |
| Non-conjugated diene: | 5-ethylidene-2-norbornene (ENB) |
| Iodine Value: | 20 |
| Intrinsic viscosity [η] measured in decalin of 135° C.: | 4.0 dl/g |
| Molecular weight distribution Q (Mw/Mn): | 3.2 |

[High-molecular component 2 (EPT-2)]

| | |
|---|---|
| Ethylene content: | 70% by mol |
| Non-conjugated diene: | 5-ethylidene-2-norbornene (ENB) |
| Iodine Value: | 20 |
| Intrinsic viscosity [η] measured in decalin of 135° C.: | 5.0 dl/g |
| Molecular weight distribution Q (Mw/Mn): | 3.5 |

[High-molecular component 3 (EPT-3)]

| | |
|---|---|
| Ethylene content: | 70% by mol |
| Non-conjugated diene: | 5-ethylidene-2-norbornene (ENB) |

-continued

| | |
|---|---|
| Iodine Value: | 20 |
| Intrinsic viscosity [η] measured in decalin of 135° C.: | 2.7 dl/g |
| Molecular weight distribution Q (Mw/Mn): | 3.1 |
| [High-molecular component 4 (EPT-4)] | |
| Ethylene content: | 71% by mol |
| Non-conjugated diene: | 5-ethylidene-2-norbornene (ENB) |
| Iodine Value: | 19 |
| Intrinsic viscosity [η] measured in decalin of 135° C.: | 4.0 dl/g |
| Molecular weight distribution Q (Mw/Mn): | 5.6 |
| [High-molecular component 5 (EPT-5)] | |
| Ethylene content: | 70% by mol |
| Non-conjugated diene: | 5-ethylidene-2-norbornene (ENB) |
| Iodine Value: | 20 |
| Intrinsic viscosity [η] measured in decalin of 135° C.: | 3.8 dl/g |
| Molecular weight distribution Q (Mw/Mn): | 3.2 |
| [Low-molecular component 1 (EP-1)] | |
| Ethylene content: | 75% by mol |
| Intrinsic viscosity [η] measured in decalin of 135° C.: | 0.24 dl/g |
| Molecular weight distribution Q (Mw/Mn): | 2.2 |
| [Low-molecular component 2 (EPT-6)] | |
| Ethylene content: | 71% by mol |
| Non-conjugated diene: | 5-ethylidene-2-norbornene (ENB) |
| Iodine Value: | 40.0 |
| Intrinsic viscosity [η] measured in decalin of 135° C.: | 0.34 dl/g |
| Molecular weight distribution Q (Mw/Mn): | 2.3 |
| [Low-molecular component 3 (EP-2)] | |
| Ethylene content: | 68% by mol |
| Intrinsic viscosity [η] measured in decalin of 135° C.: | 0.49 dl/g |
| Molecular weight distribution Q (Mw/Mn): | 2.1 |
| [Low-molecular component 4 (EPT-7)] | |
| Ethylene content: | 71% by mol |
| Non-conjugated diene: | 5-ethylidene-2-norbornene (ENB) |
| Iodine Value: | 19.0 |
| Intrinsic viscosity [η] measured in decalin of 135° C.: | 0.28 dl/g |
| Molecular weight distribution Q (Mw/Mn): | 2.3 |
| [Low-molecular component 5 (EP-3)] | |
| Ethylene content: | 60% by mol |
| Intrinsic viscosity [η] measured in decalin of 135° C.: | 1.0 dl/g |
| Molecular weight distribution Q (Mw/Mn): | 2.1 |
| [Low-molecular component 6 (EP-4)] | |
| Ethylene content: | 60% by mol |
| Intrinsic viscosity [η] measured in decalin of 135° C.: | 1.2 dl/g |
| Molecular weight distribution Q (Mw/Mn): | 2.2 |
| [Oil] | |
| Diana Process Oil PW-380 (trade name, available from Idemitsu Kosan K.K., paraffinic oil) | |

EXAMPLE 1

A suspension of 70 parts by weight of the high molecular component 1 (ethylene-propylene-5-ethylidene-2-norbornene copolymer rubber) and a suspension of 30 parts by weight of the low-molecular component 1 (ethylene/propylene copolymer) were mixed with each other, to prepare a solid ethylene/propylene/diene rubber composition.

Characteristics of the ethylene/propylene/diene rubber composition obtained as above are set forth in Table 1, and a relationship between the complex viscosity η* and the frequency ω of the rubber composition is shown in FIG. 1.

EXAMPLE 2

The procedure of Example 1 was repeated except for using the low-molecular component 3 (ethylene/propylene copolymer) instead of the low-molecular component 1, to obtain an ethylene/propylene/diene rubber composition.

Characteristics of the ethylene/propylene/diene rubber composition obtained as above are set forth in Table 1, and a relationship between the complex viscosity η* and the frequency ω of the rubber composition is shown in FIG. 1.

COMPARATIVE EXAMPLE 1

The procedure of Example 1 was repeated except for using the oil (i.e., Diana Process Oil PW-380) instead of the low-molecular component 1, to obtain an ethylene/propylene/diene rubber composition.

Characteristics of the ethylene/propylene/diene rubber composition obtained as above are set forth in Table 1, and a relationship between the complex viscosity η* and the frequency ω of the rubber composition is shown in FIG. 1.

COMPARATIVE EXAMPLE 2

The procedure of Example 1 was repeated except for using the low-molecular component 6 (ethylene/propylene copolymer) instead of the low-molecular component 1, to obtain an ethylene/propylene/diene rubber composition.

Characteristics of the ethylene/propylene/diene rubber composition obtained as above are set forth in Table 1, and a relationship between the complex viscosity η* and the frequency ω of the rubber composition is shown in FIG. 1.

FIG. 1 graphically shows a relationship between the complex viscosity η* and the frequency of each compositions obtained in the case of using the same high-molecular component and using a different low-molecular component (different in the intrinsic viscosity [η]).

In FIG. 1, when the ethylene/propylene/diene rubber composition of Comparative Example 1 using the oil as a processing aid and the ethylene/propylene/diene rubber compositions of Examples 1 and 2 were compared with each other, the ethylene/propylene/diene rubber compositions of Examples 1 and 2 are peculiarly decreased in the viscosity on the high frequency side ($\omega > 10^1$ radian/sec). This is the reason why the ethylene/propylene/diene rubber compositions of Examples 1 and 2 are excellent in the processability. On the other hand, the ethylene/propylene/diene rubber composition of Comparative Example 2 using an ethylene/propylene/diene copolymer rubber composition having an intrinsic viscosity [η] of more than 0.7 dl/g ([η]: 1.2 dl/g) as the low-molecular component is excessively increased in the viscosity, so that the processability of the composition is deteriorated.

TABLE 1

| | Com. Ex. 1 | Example 1 | Example 2 | Com. Ex. 2 |
|---|---|---|---|---|
| EPDM Mooney viscosity ML$_{1+4}$ (100° C.) | 105 | 100 | 100 | 115 |
| IV$_1$/IV$_2$ | 0 | 0 | 0 | 0 |
| Extrusion processability, Surface | 0 | 4 | 5 | 2 |

TABLE 1-continued

|  | Com. Ex. 1 | Example 1 | Example 2 | Com. Ex. 2 |
|---|---|---|---|---|
| smoothness |  |  |  |  |

As is evident from the results set forth in Table 1, the ethylene/propylene/diene rubber compositions of Examples 1 and 2 were excellent in the extrusion processability, and on the other hand, the ethylene/propylene/diene rubber compositions of Comparative Examples 1 and 2 were deteriorated in the extrusion processability and the surface smoothness.

COMPARATIVE EXAMPLE 3

100 parts by weight of the high-molecular component 3 (ethylene-propylene-5-ethylidene-2-norbornene copolymer rubber) and 60 parts by weight of the above-mentioned oil were melt-kneaded, to obtain an ethylene/propylene/diene rubber composition having Mooney viscosity $ML_{1+4}(100°\ C.)$ (after oil extension) of 36.

100 parts by weight of the ethylene/propylene/diene rubber composition obtained as above, 5 parts by weight of zinc white No. 1, 1 part by weight of stearic acid and 60 parts by weight of FEF carbon black (available from Asahi Carbon Black K.K.) were kneaded in a 4.3 liter Banbury mixer (produced by Kobe Seikosho K.K.).

The kneadate obtained as above was cooled to about 50° C. then to the kneadate were added 0 75 part by weight of sulfur, 2.0 parts by weight of Noxceler M (trade name, MBT of Ouchi Shinko Kagaku Kogyo K.K., vulcanizing accelerator), 1.5 parts by weight of Noxceler BZ (trade name, ZnBDC of Ouchi Shinko Kagaku Kogyo K.K., vulcanizing accelerator) and 0.75 part by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, the above pressing was carried out at 150° C. for 20 minutes to obtain a vulcanized molded product of large thickness employable for the compression permanent strain test and the abrasion test. The obtained vulcanized molded product of large thickness was subjected to the compression permanent strain test and the abrasion test.

Furthermore, the aforementioned fixed-load fatigue test was carried out. The vulcanizing conditions of the specimen in this test are a temperature of 150° C. and a period of 25 minutes.

The results are set forth in Table 2.

EXAMPLE 3

The procedure of Comparative Example 3 was repeated except for blending a suspension of 100 parts by weight of the high-molecular component 3 (EPT) and a suspension of 30 parts by weight of the low-molecular component 1 (EP-1) and then adding 30 parts by weight of the oil to the resulting mixture, followed by kneading the mixture by Banbury mixer, to obtain an ethylene/propylene/diene rubber composition.

The obtained ethylene/propylene/diene rubber composition had Mooney viscosity $ML_{1+4}(100°\ C.)$ (after oil extension) of 37 and $IV_1/IV_2$ of 0.

The results on the physical properties tests are set forth in Table 2.

EXAMPLES 4 & 5

The procedure of Example 3 was repeated except for using 60 parts of the low-molecular component 1 (EP-1) and 60 parts by weight of the low-molecular component 3 (EP-2) instead of 30 parts by weight of the low-molecular component 1 (EP-1) and 30 parts by weight of the oil, respectively, to obtain ethylene/propylene/diene rubber compositions. The composition contains 62.5% by weight of the high molecular weight component and 37.5% by weight of the low molecular weight component.

The ethylene/propylene/diene rubber compositions obtained in Example 4 and Example 5 had Mooney viscosity $ML_{1+4}(100°\ C.)$ of 36 and 35, respectively, and both compositions had $IV_1/IV_2$ of 0.

The results on the physical properties tests are set forth in Table 2.

COMPARATIVE EXAMPLES 4 & 5

The procedure of Example 3 was repeated except for using 60 parts of the low-molecular component 5 (EP-3) and 60 parts by weight of the low-molecular component 6 (EP-4) instead of 30 parts by weight of the low-molecular component 1 (EP-1) and 30 parts by weight of the oil, respectively, to obtain ethylene/propylene/diene rubber compositions.

The ethylene/propylene/diene rubber compositions obtained in Comparative Example 4 and Comparative Example 5 had Mooney viscosity $ML_{1+4}(100°\ C.)$ of 45 and 50, respectively, and both compositions had $IV_1/IV_2$ of 0.

The results on the physical properties tests are set forth in Table 2.

COMPARATIVE EXAMPLE 6

The procedure of Example 3 was repeated except for using 20 parts by weight of the low-molecular component 4 (EPT-7) instead of 30 parts by weight of the low-molecular component 1 (EP-1) and varying the amount of the oil to 40 parts by weight, to obtain an ethylene/propylene/diene rubber composition having Mooney viscosity $ML_{1+4}(100°\ C.)$ (after oil extension) of 36 and $IV_1/IV_2$ of 0.95.

100 parts by weight of the ethylene/propylene/diene rubber composition obtained as above, 5 parts by weight of zinc white No. 1, 1 part by weight of stearic acid and 60 parts by weight of FEF carbon black (available from Asahi Carbon Black K.K.) were kneaded in a 4.3 liter Banbury mixer (produced by Kobe Seikosho K.K.).

The kneadate obtained as above was cooled to about 50° C., then to the kneadate were added 0.9 part by weight of sulfur, 2.4 parts by weight of Noxceler M (trade name, MBT of Ouchi Shinko Kagaku Kogyo K.K., vulcanizing accelerator), 1.8 parts by weight of Noxceler BZ (trade name, ZnBDC of Ouchi Shinko Kagaku Kogyo K.K., vulcanizing accelerator) and 0.9 part by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, a vulcanized molded product of large thickness was obtained in the same manner as described in Comparative Example 3. The obtained vulcanized molded product of large thickness was subjected to the fatigue test, the compression permanent strain test and the abrasion test.

The results are set forth in Table 2.

COMPARATIVE EXAMPLE 7

The procedure of Example 3 was repeated except for using 40 parts by weight of the low-molecular component 4 (EPT-7) instead of 30 parts by weight of the low-molecular component 1 (EP-1) and varying the amount of the oil to 20 parts by weight, to obtain an ethylene/propylene/diene rubber composition having Mooney viscosity $ML_{1+4}$ (100° C.) (after oil extension) of 36 and $IV_1/IV_2$ of 0.95.

100 parts by weight of the ethylene/propylene/diene rubber composition obtained as above, 5 parts by weight of zinc white No. 1, 1 part by weight of stearic acid and 60 parts by weight of FEF carbon black (available from Asahi Carbon Black K.K.) were kneaded in a 4.3 l Banbury mixer (produced by Kobe Seikosho K.K.).

The kneadate obtained as above was cooled to about 50° C. then to the kneadate were added 1.05 parts by weight of sulfur, 2.8 parts by weight of Noxceler M (trade name, MBT of Ouchi Shinko Kagaku Kogyo K.K., vulcanizing accelerator), 2.1 parts by weight of Noxceler BZ (trade name, ZnBDC of Ouchi Shinko Kagaku Kogyo K.K., vulcanizing accelerator) and 1.05 parts by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, a vulcanized molded product of large thickness was obtained in the same manner as described in Comparative Example 3. The obtained vulcanized molded product of large thickness was subjected to the fatigue test, the compression permanent strain test and the abrasion test.

The results are set forth in Table 2.

COMPARATIVE EXAMPLE 8

The procedure of Example 3 was repeated except for using 60 parts by weight of the low-molecular component 4 (EPT-7) instead of 30 parts by weight of the low-molecular component 1 (EP-1) and not using the oil, to obtain an ethylene/propylene/diene rubber composition having Mooney viscosity $ML_{1+4}$(100° C.) of 36 and $IV_1/IV_2$ of 0.95.

100 parts by weight of the ethylene/propylene/diene rubber composition obtained as above, 5 parts by weight of zinc white No. 1, 1 part by weight of stearic acid and 60 parts by weight of FEF carbon black (available from Asahi Carbon Black K.K.) were kneaded in a 4.3 liter Banbury mixer (produced by Kobe Seikosho K.K.).

The kneadate obtained as above was cooled to about 50° C., then to the kneadate were added 1.2 parts by weight of sulfur, 3.2 parts by weight of Noxceler M (trade name, MBT of Ouchi Shinko Kagaku Kogyo K.K., vulcanizing accelerator), 2.4 parts by weight of Noxceler BZ (trade name, ZnBDC of Ouchi Shinko Kagaku Kogyo K.K., vulcanizing accelerator) and 1.2 parts by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, a vulcanized molded product of large thickness was obtained in the same manner as described in Comparative Example 3. The obtained vulcanized molded product of large thickness was subjected to the fatigue test, the compression permanent strain test and the abrasion test.

The results are set forth in Table 2.

COMPARATIVE EXAMPLE 9

The procedure of Example 3 was repeated except for using 60 parts by weight of the low-molecular component 2 (EPT-6) instead of 30 parts by weight of the low-molecular component 1 (EP-1) and not using the oil, to obtain an ethylene/propylene/diene rubber composition having Mooney viscosity $ML_{1+4}$(100° C.) of 36 and $IV_1/IV_2$ of 2.

100 parts by weight of the ethylene/propylene/diene rubber composition obtained as above, 5 parts by weight of zinc white No. 1, 1 part by weight of stearic acid and 60 parts by weight of FEF carbon black (available from Asahi Carbon Black K.K.) were kneaded in a 4.3 liter Banbury mixer (produced by Kobe Seikosho K.K.).

The kneadate obtained as above was cooled to about 50° C., then to the kneadate were added 1.2 parts by weight of sulfur, 3.2 parts by weight of Noxceler M (trade name, MBT of Ouchi Shinko Kagaku Kogyo K.K., vulcanizing accelerator), 2.4 parts by weight of Noxceler BZ (trade name, ZnBDC of Ouchi Shinko Kagaku Kogyo K.K., vulcanizing accelerator) and 1.2 parts by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, a vulcanized molded product of large thickness was obtained in the same manner as described in Comparative Example 3. The obtained vulcanized molded product of large thickness was subjected to the fatigue test, the compression permanent strain test and the abrasion test.

The results are set forth in Table 2.

TABLE 2

|  | Comp. Ex. 3 | Ex 3 | Ex. 4 | Ex. 5 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Kind of high- | EPT-3 | EPT-3 | EPT-3 | EPT-3 | EPT-3 | EPT-3 | EPT-3 | EPT-3 | EPT-3 | EPT-3 |

TABLE 2-continued

| | Comp. Ex.3 | Ex 3 | Ex. 4 | Ex. 5 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| molecular component | | | | | | | | | | |
| Kind of low-molecular component | — | EP-1 | EP-1 | EP-2 | EP-3 | EP-4 | EPT-7 | EPT-7 | EPT-7 | EPT-6 |
| Oil | 60 | 30 | — | — | — | — | 40 | 20 | — | — |
| $M_{25}$ [kg f/cm$^2$] | 5.7 | 5.7 | 5.6 | 5.8 | 7.8 | 9.0 | 7.0 | 8.5 | 8.9 | 9.5 |
| $M_{100}$ [kg f/cm$^2$] | 13 | 13 | 13 | 13 | 15 | 17 | 14 | 17 | 17 | 18 |
| $M_{200}$ [kg f/cm$^2$] | 27 | 29 | 30 | 32 | 30 | 33 | 26 | 33 | 33 | 34 |
| $M_{300}$ [kg f/cm$^2$] | 44 | 48 | 50 | 51 | 52 | 52 | 42 | 51 | 53 | 54 |
| TB [kg f/cm$^2$] | 180 | 222 | 211 | 210 | 224 | 244 | 190 | 191 | 203 | 221 |
| $E_B$ [%] | 730 | 750 | 740 | 730 | 740 | 790 | 720 | 680 | 700 | 720 |
| $H_s$ (JIS A) | 52 | 52 | 52 | 52 | 60 | 63 | 53 | 54 | 55 | 56 |
| Compression permanent strain [%] | | | | | | | | | | |
| 100° C., 22 hrs | 35 | 33 | 33 | 33 | 35 | 35 | 36 | 39 | 50 | 51 |
| 120° C., 22 hrs | 37 | 36 | 36 | 36 | 37 | 38 | 56 | 59 | 65 | 68 |
| Rolling processability | 2 | 5 | 5 | 5 | 4 | 3 | 5 | 5 | 5 | 5 |
| Fixed-load fatigue test [× 10$^3$ times] | | | | | | | | | | |
| 60 kg f/cm$^2$ | 325 | 350 | 340 | 300 | 190 | 100 | 250 | 190 | 120 | 90 |
| 70 kg f/cm$^2$ | 75 | is | 74 | 65 | 45 | 35 | 50 | 40 | 38 | 20 |
| 80 kg f/cm$^2$ | 18 | 18 | 16 | 14 | 10 | 6 | 15 | 8 | 7 | 3 |

Note:
High-molecular component: 100 parts by weight (62.5% by weight).
Low-molecular component + Oil: 60 parts by weight (37.5% by weight).

The followings have been confirmed from the results set forth in Table 2.

The ethylene/propylene/diene rubber compositions of Examples 3, 4 and 5 employ an ethylene/propylene copolymer rubber having an intrinsic viscosity [η] within the range of 0.2 to 0.7 dl/g as the low-molecular component, so that these rubber compositions are excellent in the rolling processability. Further, the vulcanized rubber molded products obtained from these rubber compositions are excellent in the low-compression permanent strain properties, and the resistance to dynamic fatigue thereof is almost the same as that of the vulcanized rubber molded product obtained form the ethylene/propylene/diene rubber composition of Comparative Example 3.

On the contrary, the ethylene/propylene/diene rubber composition of Comparative Example 3 employs an oil having an intrinsic viscosity [η] of less than 0.2 dl/g as the low-molecular component, so that this rubber composition is deteriorated in the rolling processability.

The ethylene/propylene/diene rubber compositions of Comparative Examples 4 and 5 employ an ethylene/propylene copolymer rubber having an intrinsic viscosity [η] of more than 0.7 dl/g as the low-molecular component, so that these rubber compositions are deteriorated in the rolling processability. Further, the vulcanized rubber molded products obtained from these rubber compositions are markedly low in the resistance to dynamic fatigue, and this is clear when compared with Comparative Example 3 and Examples 3, 4 and 5.

The ethylene/propylene/diene rubber compositions of Comparative Examples 6, 7, 8 and 9 employ an ethylene/propylene/diene copolymer rubber containing diene (ENB) as the low-molecular component, so that the vulcanized rubber molded products obtained from these rubber compositions are deteriorated in both the low-compression permanent strain properties and the resistance to dynamic fatigue.

EXAMPLE 6, COMPARATIVE EXAMPLE 10 & EXAMPLE 7

The procedure of Example 4 was repeated except for using the high-molecular component 1 (EPT-1), the high-molecular component 4 (EPT-4) and the high-molecular component 2 (EPT-2), respectively, instead of the high-molecular component 3 (EPT-3), to obtain ethylene/propylene/diene rubber compositions.

The ethylene/propylene/diene rubber compositions obtained in Example 6, Comparative Example 10 and Example 7 had Mooney viscosity ML$_{1+4}$(100° C.) of 87, 80 and 135, respectively, and all compositions had IV$_1$/IV$_2$ of 0.

The results on the physical properties tests are set forth in Table 3.

COMPARATIVE EXAMPLE 11, 12 & 13

The procedure of Example 4 was repeated except for using the high-molecular component 1 (EPT-1), the high-molecular component 4 (EPT-4) and the high-molecular component 2 (EPT-2), respectively, instead of the high-molecular component 3 (EPT-3), and using the oil instead of the low-molecular component 1 (EP-1) in each case, to obtain ethylene/propylene/diene rubber compositions.

The ethylene/propylene/diene rubber compositions obtained in Comparative Example 11, Comparative Example 12 and Comparative Example 13 had Mooney viscosity $ML_{1+4}(100°\ C.)$ (before oil extension) of 270, 260 and 430, respectively. These Mooney viscosity $ML_{1+4}(100°\ C.)$ were unable to be measured directly by means of Mooney viscometer, but they were presumed from a relationship between the intrinsic viscosity $[\eta]$ and the Mooney viscosity $ML_{1+4}(100°\ C.)$.

The results on the physical properties tests are set forth in Table 3.

material such as carbon in the dispersibility in the ethylene/propylene/diene rubber composition.

On the other hand, the vulcanized rubber molded products obtained from the ethylene/propylene/diene rubber compositions of Comparative Examples 3, 10, 11, 12 and 13 in which an oil is used as the low-molecular component are improved in the dry physical properties but deteriorated in the resistance to dynamic fatigue, as the molecular weight (intrinsic viscosity $[\eta]$) of the compositions becomes higher. This tendency is markedly shown under application of a high load. The

TABLE 3

| | Ex. 4 | Ex 6 | Comp. Ex. 10 | Ex. 7 | Comp. Ex. 3 | Comp Ex. 11 | Comp. Ex. 12 | Comp Ex. 13 |
|---|---|---|---|---|---|---|---|---|
| Kind of high-molecular component | EPT-3 | EPT-1 | EPT-4 | EPT-2 | EPT-3 | EPT-1 | EPT-4 | EPT-2 |
| Kind of low-molecular component | EP-1 | EP-1 | EP-1 | EP-1 | — | — | — | — |
| Oil | — | — | — | — | 60 | 60 | 60 | 60 |
| $M_{25}$ [kg f/cm²] | 5.6 | 6.3 | 6.0 | 6.2 | 5.7 | 6.3 | 6.0 | 6.2 |
| $M_{100}$ [kg f/cm²] | 13 | 14 | 13 | 14 | 13 | 14 | 13 | 14 |
| $M_{200}$ [kg f/cm²] | 30 | 32 | 29 | 33 | 27 | 32 | 29 | 32 |
| $M_{300}$ [kg f/cm²] | 50 | 54 | 45 | 55 | 44 | 53 | 45 | 54 |
| TB [kg f/cm²] | 211 | 250 | 195 | 285 | 180 | 218 | 170 | 255 |
| $E_B$ [%] | 740 | 740 | 750 | 760 | 730 | 700 | 720 | 700 |
| $H_s$ (JIS A) | 52 | 52 | 52 | 53 | 52 | 53 | 52 | 53 |
| Compression permanent strain [%] | | | | | | | | |
| 100° C., 22 hrs | 33 | 30 | 37 | 28 | 35 | 30 | 36 | 28 |
| 120° C., 22 hrs | 36 | 31 | 41 | 30 | 37 | 31 | 40 | 30 |
| Rolling processability | 5 | 5 | 5 | 5 | 2 | 1 | 2 | 1 |
| Fixed-load fatigue test [$\times 10^3$ times] | | | | | | | | |
| 60 kg f/cm² | 340 | 375 | 320 | 380 | 325 | 370 | 360 | 370 |
| 70 kg f/cm² | 74 | 140 | 70 | 160 | 95 | 150 | 50 | 65 |
| 80 kg f/cm² | 16 | 28 | 15 | 60 | 18 | 30 | 12 | 10 |

Note:
High-molecular component: 100 parts by weight
Low-molecular component: 60 parts by weight The followings have been confirmed from the results set forth in Table 3.

The ethylene/propylene/diene rubber compositions of Examples 4, 6 and 7 employ an ethylene/propylene copolymer rubber having an intrinsic viscosity $[\eta]$ within the range of 0.2 to 0.7 dl/g as the low-molecular component, so that these compositions are excellent in rolling processability. For example, even the ethylene/propylene/diene rubber composition of Example 7 employing the ultra-high-molecular component having an intrinsic viscosity $[\eta]$ of 5.0 dl/g [Mooney viscosity $ML_{1+4}(100°\ C.)$: 400] shows high rolling processability. Further, the vulcanized rubber molded product obtained from this rubber composition is excellent in both the dry physical properties and the resistance to dynamic fatigue. Particularly, the molded product is excellent in the resistance to dynamic fatigue under a high load. These excellent effects are considered to be brought about by the enhancement of the reinforcing reason is that the rolling processability of those ethylene/propylene/diene rubber compositions is low and secondary materials are poorly dispersed.

COMPARATIVE EXAMPLE 14

100 parts by weight of an ethylene-5-ethylidene-2norbornene copolymer rubber (EPT) (as the ethylene/propylene/diene rubber) having ethylene content of 68% by mol, iodine value of 22 and Mooney viscosity $ML_{1+4}(100°\ C.)$ of 69 and 60 parts by weight of the aforementioned oil were melt-kneaded.

Then, the obtained kneadate, 5 parts by weight of zinc white No. 1, 1 part by weight of stearic acid and 60 parts by weight of FEF carbon black (available from Asahi Carbon Black K.K.) were kneaded in a 4.3 liter Banbury mixer (produced by Kobe Seikosho K.K.).

The kneadate obtained as above was cooled to about 50° C., then to the kneadate were added 0.75 part by weight of sulfur, 2.0 parts by weight of Noxceler M (trade name, MBT of Ouchi Shinko Kagaku Kogyo K.K., vulcanizing accelerator), 1.5 parts by weight of Noxceler BZ (trade name, ZnBDC of Ouchi Shinko Kagaku Kogyo K.K., vulcanizing accelerator) and 0.75 part by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, the above pressing was carried out at 150° C. for 20 minutes to obtain a vulcanized molded product of large thickness employable for the compression permanent strain test and the abrasion test. The obtained vulcanized molded product of large thickness was subjected to the compression permanent strain test and the abrasion test.

Moreover, the aforementioned fixed-load fatigue test was also carried out. The vulcanizing conditions of the specimen in this test are a temperature of 150° C. and a period of 25 minutes.

The EPT was a polymer having a monomodal molecular weight distribution.

The results are set forth in Table 4.

EXAMPLE 8

The procedure of Example 3 was repeated except for using the high-molecular component 5 (EPT-5) instead of the high-molecular component 3 (EPT-3), and using 60 parts by weight of the low-molecular component 3 (EP-2) instead of 30 parts by weight of the low-molecular component 1 (EP-1) and 30 parts by weight of the oil, to obtain an ethylene/propylene/diene rubber composition having ethylene content of 69% by mol, iodine value of 13, Mooney viscosity $ML_{1+4}(100°\ C.)$ of 70 and $IV_1/IV_2$ of 0.

100 parts by weight of the ethylene/propylene/diene rubber composition obtained as above, 5 parts by weight of zinc white No. 1, 1 part by weight of stearic acid and 60 parts by weight of FEF carbon black (available from Asahi Carbon Black K.K.) were kneaded in a 4.3 liter Banbury mixer (produced by Kobe Seikosho K.K.).

The kneadate obtained as above was cooled to about 50° C., then to the kneadate were added 0.75 part by weight of sulfur, 2.0 parts by weight of Noxceler M (trade name, MBT of Ouchi Shinko Kagaku Kogyo K.K., vulcanizing accelerator), 1.5 parts by weight of Noxceler BZ (trade name, ZnBDC of Ouchi Shinko Kagaku Kogyo K.K., vulcanizing accelerator) and 0.75 part by weight of Noxceler TT (trade name, TMTD of Ouchi Shinko Kagaku Kogyo K.K., vulcanizing accelerator), and they were kneaded by means of roll. The resulting kneadate was rolled into a sheet, and the sheet was pressed at 150° C. for 18 minutes, to obtain a vulcanized sheet having a thickness of 2 mm. The obtained vulcanized sheet was subjected to physical properties tests.

Further, the fatigue test, the compression permanent strain test and the abrasion test were carried out in the same manners as described in Comparative Example 14.

The results are set forth in Table 4.

TABLE 4

| | Com. Ex. 14 | Example 8 |
|---|---|---|
| $ML_{1+4}$ (100° C.) | 69 | 70 |
| Rolling | 2 | 5 |
| processability | | |
| $M_{25}$ [kgf/cm$^2$] | 5.0 | 6.2 |
| $M_{100}$ [kgf/cm$^2$] | 11 | 13 |
| $M_{200}$ [kgf/cm$^2$] | 24 | 30 |
| $M_{300}$ [kgf/cm$^2$] | 40 | 51 |
| $T_B$ [kgf/cm$^2$] | 170 | 225 |
| $E_B$ [%] | 540 | 740 |
| $H_S$ (JIS A) | 53 | 52 |
| Abrasion resistance (cc/1,000 times) | 3.1 | 2.7 |
| Shape retention properties [%] | 43 | 92 |

I claim:

1. A vulcanizable α-olefin/diene rubber composition comprising:

95–50% by weight of a high-molecular ethylene/α-olefin/diene copolymer rubber (A) derived from ethylene, α-olefin of 3–20 carbon atoms and non-conjugated diene and having a molecular weight distribution Q (weight-average molecular weight (Mw)/number average molecular weight (Mn)) of less than 4 as measured by GPC measuring method, an intrinsic viscosity (η) of 2.7 to 6.0 dl/g as measured in decalin of 135° C. and an iodine value of 10 to 40; and 5–50% by weight of a low-molecular ethylene/α-olefin copolymer (B) derived from ethylene and α-olefin of 3–20 carbon atoms, wherein the low-molecular weight ethylene/α-olefin component (B) contains 20 to 80 mol % ethylene and having an intrinsic viscosity (η) of 0.2 to 0.7 dl/g as measured in decalin of 135° C.;

said vulcanizable composition having Mooney viscosity $ML_{1+4}$ (100° C.) ranging from 20 to 150 and a ratio ($IV_1/IV_2$) of an iodine value ($IV_1$) of the ethylene/α-olefin rubber composition having a number average molecular weight of 3,000 to 15,000 to an iodine value ($IV_2$) of the ethylene/α-olefin/diene rubber composition having a number-average molecular weight of 80,000 to 120,000 of not more than 0.1.

2. The ethylene/α-olefin/diene rubber composition as claimed in claim 1, wherein the ratio of $IV_1/IV_2$ is 0.

3. The vulcanizable rubber composition of claim 1 wherein the low-molecular weight ethylene/α-olefin component (B) contains 30 to 70 mol % ethylene.

4. A vulcanizable ethylene/α-olefin/diene rubber composition comprising:

90–50% by weight of a high-molecular ethylene/α-olefin/diene copolymer rubber (A) derived from ethylene, α-olefin of 3–20 carbon atoms and non-conjugated diene and having a molecular weight distribution Q (weight-average molecular weight (Mw)/number average molecular weight (Mn)) of less than 4 as measured by GPC measuring method, an intrinsic viscosity (η) of 3.0 to 6.0 dl/g as measured in decalin of 135° C. and an iodine value of 10 to 40; and 10–50% by weight of a low-molecular ethylene/α-olefin copolymer (B) derived from ethylene and α-olefin of 3–20 carbon atoms., wherein the low-molecular weight ethylene/α-olefin component (B) contains 20 to 80 mol % ethylene and having an intrinsic viscosity (θ) of 0.24 to 0.5 dl/g as measured in decalin of 135° C.;

said vulcanizable composition having Mooney viscosity $ML_{1+4}$ (100° C.) ranging from 30 to 135 and a ratio ($IV_1/IV_2$) of an iodine value ($IV_1$) of the ethylene/α-olefin rubber composition having a number average molecular weight of 3,000 to 15,000 to an iodine value ($IV_2$) of the ethylene/α-olefin/diene rubber composition having a number-average molecular weight of 80,000 to 120,000 of not more than 0.1.

5. The solid vulcanizable rubber composition of claim 4 wherein the low-molecular weight ethylene/α-olefin component (B) contains 40 to 60 mol % ethylene.

6. The ethylene/α-olefin/diene rubber composition as claimed in claim 4, wherein the ratio of $IV_1/IV_2$ is 0.

7. A vulcanizable ethylene/α-olefin/diene rubber composition comprising:

90–62.5% by weight of a high-molecular ethylene/α-olefin/diene copolymer rubber (A) derived from ethylene, a-olefin of 3–20 carbon atoms and non-conjugated diene and having a molecular weight distribution Q (weight-average molecular weight (Mw)/number average molecular weight (Mn)) of less than 4 as measured by GPC measuring method, an intrinsic viscosity ($\eta$) of 3.0 to 6.0 dl/g as measured in decalin of 135° C. and an iodine value of 10 to 40; and 10–37.5% by weight of a low-molecular ethylene/α-olefin copolymer (B) derived from ethylene and α-olefin of 3–20 carbon atoms, wherein the low-molecular weight ethylene/α-olefin component (B) contains 40 to 60 mol % ethylene, and having an intrinsic viscosity ($\theta$) of 0.24 to 0.5 dl/g as measured in decalin of 135° C.;

said vulcanizable composition having Mooney viscosity $ML_{1+4}$ (100° C.) ranging from 30 to 135 and a ratio ($IV_1/IV_2$) of an iodine value ($IV_1$) of the ethylene/α-olefin rubber composition having a number average molecular weight of 3,000 to 15,000 to an iodine value ($IV_2$) of the ethylene/α-olefin/diene rubber composition having a number-average molecular weight of 80,000 to 120,000 of not more than 0.1.

8. The ethylene/α-olefin/diene rubber composition as claimed in claim 7, wherein the ratio of $IV_1/IV_2$ is 0.

* * * * *